(12) United States Patent
Kostamaa et al.

(10) Patent No.: US 7,792,809 B2
(45) Date of Patent: Sep. 7, 2010

(54) DATABASE SYSTEM

(75) Inventors: Pekka Kostamaa, Santa Monica, CA (US); Bhashyam Ramesh, Secunderabad (IN)

(73) Assignee: Tera data US, Inc., Miamisburg, OH (US)

( * ) Notice: Subject to any disclaimer, the term of this patent is extended or adjusted under 35 U.S.C. 154(b) by 827 days.

(21) Appl. No.: 11/608,407

(22) Filed: Dec. 8, 2006

(65) Prior Publication Data
US 2007/0143253 A1 Jun. 21, 2007

(51) Int. Cl.
*G06F 17/30* (2006.01)
(52) U.S. Cl. ........................................ 707/705; 707/802
(58) Field of Classification Search ............... 707/2, 707/100, 101, 705, 802, 999.001
See application file for complete search history.

(56) References Cited

U.S. PATENT DOCUMENTS

| 7,054,852 | B1 * | 5/2006 | Cohen ................................ 1/1 |
| 7,174,353 | B2 * | 2/2007 | Friske et al. ................ 707/203 |
| 7,599,923 | B2 * | 10/2009 | Brown et al. ....................... 1/1 |
| 2002/0078094 | A1 * | 6/2002 | Krishnaprasad et al. ..... 707/513 |

* cited by examiner

*Primary Examiner*—Cheryl Lewis

(57) ABSTRACT

There is provided a parallel database system 1. System 1 includes a storage device 2 for maintaining a plurality of rows 3. System 1 also includes a plurality of access modules 4 for accessing in parallel a respectively assigned one or more of rows 3. An interface 5 receives data 6 indicative of a table 7 defined by a selection 8 of rows 3. A processor 9 is responsive to data 6 for selectively designating table 7 to be a single-module table. In this single module table, selection 8 is collectively assigned to an owning one of modules 4, indicated by reference numeral 10.

17 Claims, 4 Drawing Sheets

DATABASE SYSTEM

FIELD OF THE INVENTION

The present invention relates to a database system. The invention has been primarily developed for facilitating efficient retrieval of various types of data, and will be described by reference to that application. However, the invention is by no means restricted as such, and is readily implemented for data management in a broader sense.

BACKGROUND

Any discussion of the prior art throughout the specification should in no way be considered as an admission that such prior art is widely known or forms part of common general knowledge in the field.

In database systems, data is typically stored as rows. These rows collectively define one or more data tables.

In many parallel database systems, such as those making use of MPP architecture, each row is assigned to a respective access module. This access module—commonly known as an Access Module Processor (AMP) or unit of parallelism—accesses the row or rows assigned to it. In particular it reads from, writes to, or searches within the row or rows.

Typically, the rows of a given table are hashed across a plurality of available access modules in accordance with a predefined hashing protocol. This is designed to provide efficient access to the data. That is, where a query requires searching of the rows of a data table, the plurality of access modules each search in parallel the row or rows respectively assigned to them. The net result is that a plurality of the rows are searched in parallel, which reduces processing time.

Such systems are prone to scalability problems insofar as small tables or single row operations are concerned.

In the case of small tables, the distribution of rows across access modules is often skewed. For example: where a table has a number of rows that is less than the number of available access modules, this implies that some access modules have no rows assigned to them. Others perhaps have only one or few rows assigned to them. The cost of coordinating and processing in all of the access modules far exceeds the actual access operation involved in accessing the small table. This means overheads for operations on these types of tables do not scale.

Single row operations include the likes of an ATM transaction fetching the balance for an account. Such an operation incurs a coordination overhead when processed in a shared nothing MPP system. This overhead includes processing in multiple access modules, messaging between the access modules, lack of batching effect on multi-row transactions, and coordinating the results across the access modules.

SUMMARY

It is an object of the present invention to overcome or ameliorate at least one of the disadvantages of the prior art, or to provide a useful alternative.

In accordance with a first aspect of the invention, there is provided a database system including:
  a storage device for maintaining a plurality of rows;
  a plurality of access modules for accessing in parallel a respectively assigned one or more of the rows;
  an interface for receiving data indicative of a table defined by a selection of the rows; and
  a processor responsive to the data for selectively designating the table to be a single-module table wherein the selection of rows are collectively assigned to an owning one of the access modules.

In a preferred embodiment, the database system makes use of massively parallel processing architecture.

Typically the data is in the form of a user command. This user command is preferably provided by a user for designating the table to be a single module table.

Preferably the storage device maintains the table and of a copy of the table, and the rows defining the copy of the table are distributively assigned to a plurality of the access modules. More preferably an optimizer is responsive to a submitted database query of the table for determining whether either or both of the table and the copy of the table is to be used in the execution of the query. Preferably the optimizer makes the determination on the basis of estimated processing costs of the query. In some cases the single-module table is a fallback copy of the multiple-module table. In other cases the multiple-module table is a fallback copy of the single-module table.

Preferably the owning access module is dynamic. In some embodiments the owning access module is dynamic to provide load balancing among the plurality of modules. In other embodiments the database system includes a plurality of nodes, each node carrying a parsing processor and one or more of the modules, and the owning access module is dynamic to allow co-location of processing and parsing to a single node for a given query.

Preferably the storage device includes a predefined location for maintaining the single module table. More preferably the predefined location is a common disk area accessible by a predetermined one or more of the modules such that the table is accessible to those predetermined one or more modules. In a preferred embodiment the common disk area is accessible by all of the plurality of modules such that the table is accessible to all of the plurality of modules.

According to a further aspect of the invention, there is provided a database system including:
  a plurality of nodes for accessing data; and
  a plurality of primary storage locations each for maintaining a portion of the data, each portion being maintained for access by a respective associated one of the nodes; and
  a secondary storage location for selectively maintaining one or more portions of the data for access by a predetermined one or more of the nodes.

In a preferred embodiment the secondary storage location maintains the one or more portions of the data for access by any of the nodes.

BRIEF DESCRIPTION OF THE DRAWINGS

Benefits and advantages of the present invention will become apparent to those skilled in the art to which this invention relates from the subsequent description of exemplary embodiments and the appended claims, taken in conjunction with the accompanying drawings, in which:

DETAILED DESCRIPTION

Figure 1:
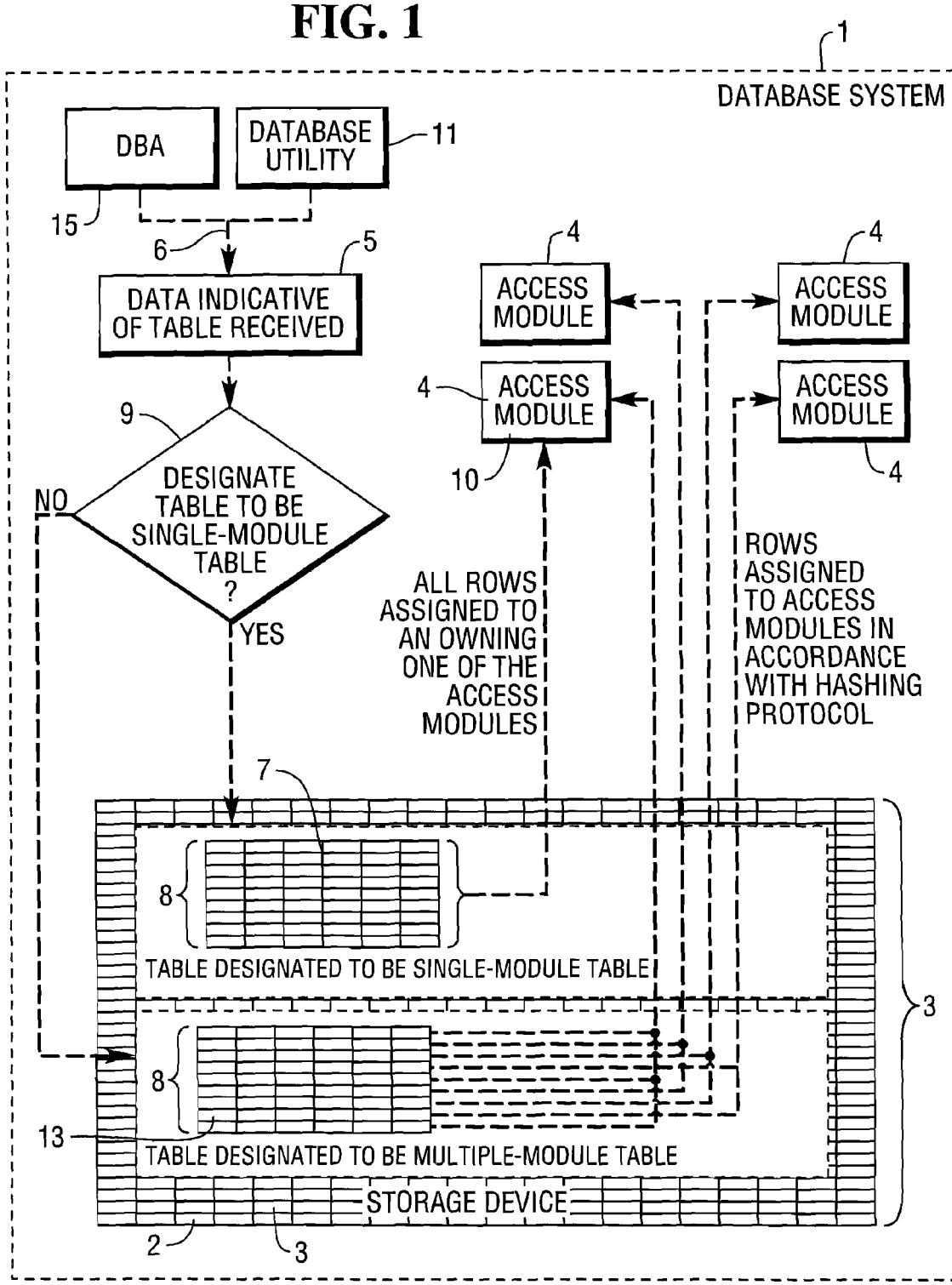
FIG. 1 is a schematic representation of a database system according to an embodiment of the invention.

FIG. 1 illustrates a parallel database system 1. System 1 includes a storage device 2 for maintaining a plurality of rows 3. System 1 also includes a plurality of access modules 4 for accessing in parallel a respectively assigned one or more of rows 3. An interface 5 receives data 6 indicative of a table 7 defined by a selection 8 of rows 3. A processor 9 is responsive to data 6 for selectively designating table 7 to be a single-module table. In this single module table, selection 8 is collectively assigned to an owning one of modules 4, indicated by reference numeral 10.

The designation of table 7 as a single-module table will be recognized as a significant departure from typical parallel database methodology. In known parallel databases, the rows of a given table are assigned across a plurality of modules 4—if not all of modules 4—in accordance with a predefined protocol. For example, in some cases the rows are hashed across the modules. In a known database, a query of table 7 is processed using a plurality of modules 4 in parallel, with each module 4 accessing only the or each row assigned to it. In system 1, only module 10 is used for processing such a query.

For the sake of the present disclosure, the phrase "accessing a row" includes any one or more of reading from, writing to, or searching within that row. Each row 3 is assigned to at most one module 4 at any given time. Each module 4 is capable of having one or more rows 3 assigned to it at any one time.

System 1 is enabled to function in the known manner in relation to tables that are not designated by processor 9 to be single-module tables. That is, rows in these tables are hashed to the access modules in a known manner. For the purpose of this disclosure, such tables are referred to multiple-module tables. A multiple module table 13 is also shown in FIG. 1.

In the present embodiment multiple-module tables are the default table type. That is, processor 9 only designates table 7 to be a single-module table where certain predetermined conditions are satisfied. Typically these predetermined conditions include the existence of a specific designation command. However, in other embodiments the processor is responsive to general database statistics, protocols and factors. For example, a standing instruction providing that a certain class of tables are not permitted to be of single-module status. Where the predetermine conditions are not satisfied, processor 9 takes no action, and table 7 is by default designated to be a multiple-module table. In other embodiments processor 9 actively designates table 7 to be a multiple-module table where the predetermined conditions are not met. In still further embodiments processor 9 is actuated to designate table 7 as single-module by default.

Typically, data 6 is in the form of a user command, provided by a user for designating the table to be a single module table. As such, processor 9 is responsive to a user command for selectively designating single-module status to table 7. For example, a database administrator (DBA) 15 provides a command in the form of data 6 to interface 5. This data identifies a particular table 7, and effectively instructs processor 9 to designate single-module status to that table. In other embodiments a command is provided by an embedded database administration utility 11. For example, a tool is responsive to a workload of queries and identifies one or more tables that are commonly subjected to single row operations. Data 6 indicative of those tables is provided to interface 5.

For the sake of this disclosure, a "user" includes both a human user and an electronic user. That is, a user command is provided either by a human user such as DBA 15 or an electronic user such as utility 11.

It will be appreciated that where a table has less than a threshold number of rows, it is often preferable for that table to be a single-module table. A typical threshold number of rows is selected by reference to the total number of processing modules 4. For example, in some embodiments the threshold number is the number of modules, whilst in other embodiments it is an integral multiple of the number of modules. In some cases the threshold is set by reference also to the individual processing capabilities of each module and to the total number of rows 3 in device 2. Given that the eventual number of rows is not typically known when a table is defined, the single-module status is user defined based on an anticipated number of rows, or alternately anticipated access patterns.

In other embodiments, processor 9 is responsive to table 7 having fewer than a threshold number of rows for automatically designating single-module status. The number of rows in a table is typically a dynamic quantity, and in some cases processor 9 automatically redefines a table to be multi-module as the number of rows changes.

It will be appreciated that, in many embodiments, interface 5 and processor 9 are not individual discrete components. Indeed, they are typically embedded functionalities within system 1 and carried by one or more other components. For example: in a situation where DBA 15 provides an explicit command to assign selection 8 to module 10.

Figure 2:
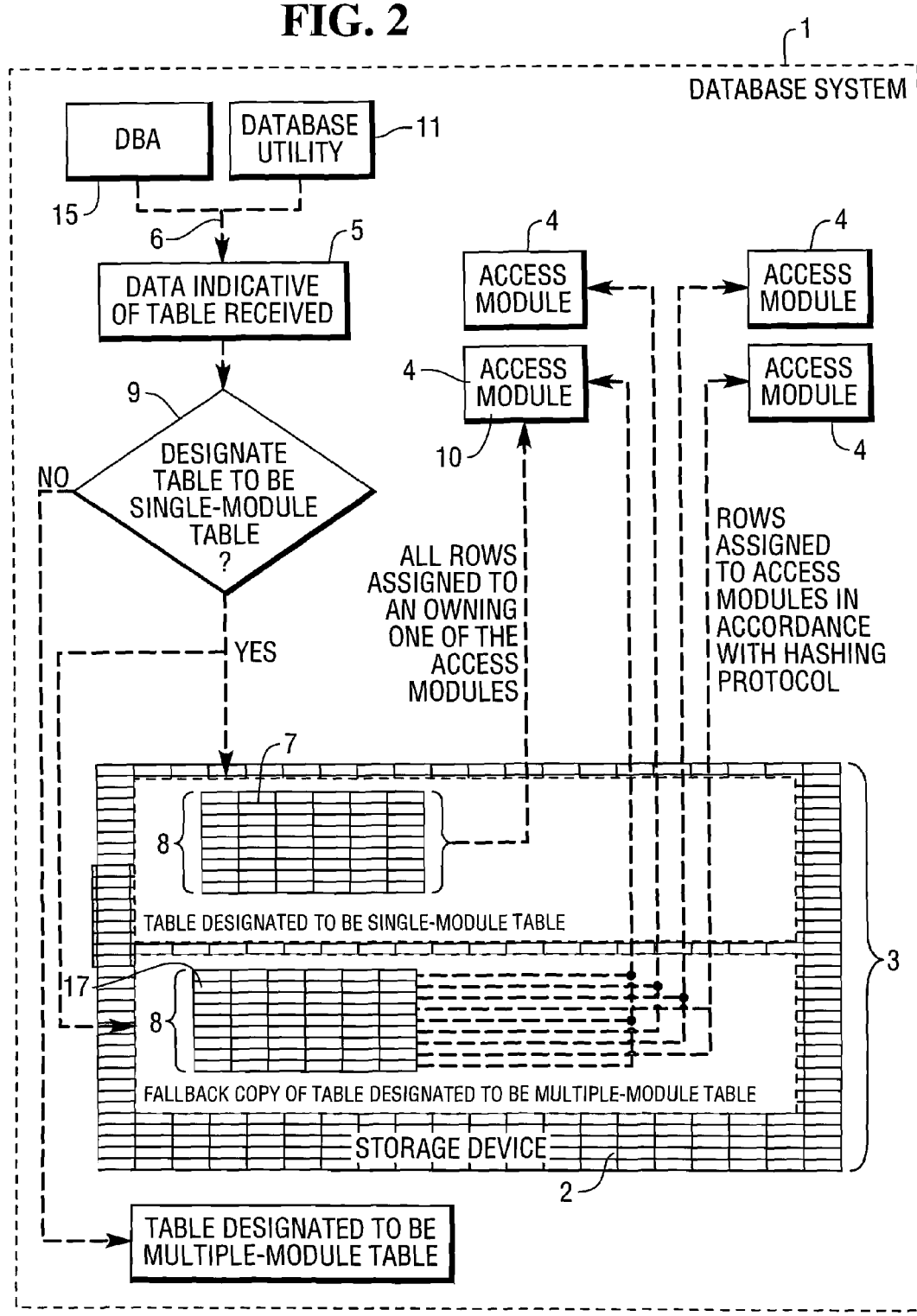
FIG. 2 is a schematic representation of a database system according to a further embodiment.

System 1 is, in some embodiments, enabled to maintain a single-module and a multiple-module version of the same table. As example of such an embodiment is shown in FIG. 2. In this embodiment, a second copy of table 7, in the form of table 17, is maintained on device 2. Table 7 is a single-module table, and table 17 is a multiple module table. In this instance, table 17 is a fallback copy of table 7, as commonly used in known database systems. In other similar embodiments table 7 is a fallback copy of table 17.

Figure 3:
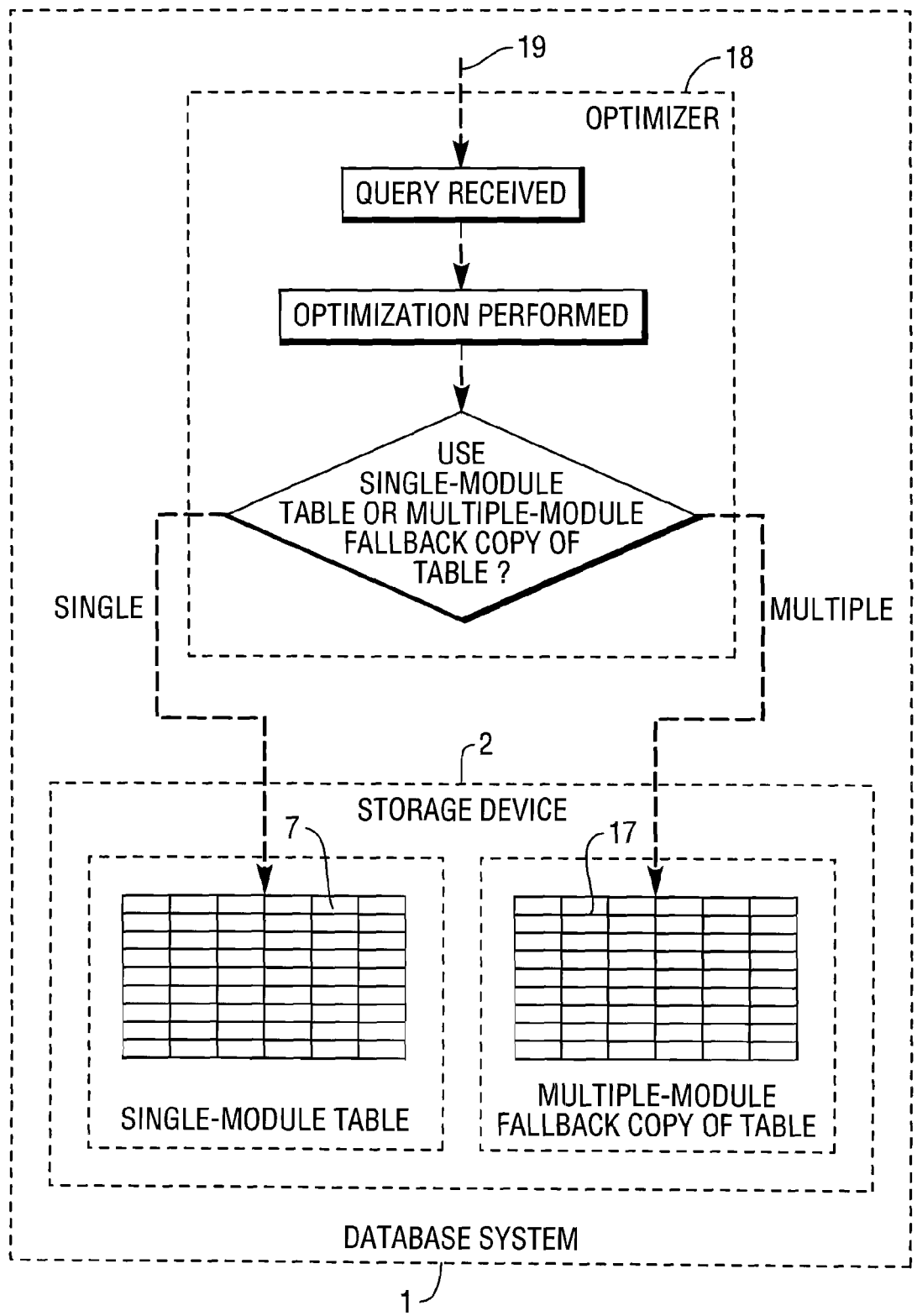
FIG. 3 is a schematic representation of optimization within the system of FIG. 2.

The underlying rationale behind this embodiment is to provide the benefits of both possible table types without the need without the need for the user to manually maintain duplicate information. Although typically a fallback copy of a table is not used for query processing, in this embodiment table 17 is readily available for such a purpose. System 1 includes an optimizer component 18 that generates an execution plan for an incoming query 19. The optimizer has knowledge of the existence of tables 7 and 17, and selects which version is to be used for a particular query or query step on the basis of ordinary optimization techniques. This is shown schematically in FIG. 3.

In other embodiments a table 17 is provided for each single-module table 7 regardless of whether fallback copies are used. That is, wherever processor 9 designates single-module status to a table 7, a multiple-module table 17 is automatically created. Alternately, processor 9 creates a single-module table 7 where a multiple-module table 17 is pre-existing. In further embodiments a table 7 and a table 17 are only concurrently maintained where predefined criteria are met.

Although system 1 shows the owning access module 10 as being a defined one of modules 4, in the present embodiment this owning module is dynamic. That is, table 7 is designated as a single-module table, however the precise identity of module 10 among modules 4 is not fixed. Processor 9 is responsible for selecting an appropriate module 10 from available modules 4, and this selection is typically based on a number of factors, as discussed below. Processor 9 is enabled to change this selection where protocol dictates. The net effect is that table 7 is owned by a single module 10, however the identity of this module between modules 4 is variable over time. This is refereed to as dynamic table ownership.

Processor 10 is typically integrated within a module management utility. This utility is responsible for the assignment of rows to modules, and has knowledge of the level of usage experienced by each module. An owning module 10 is often selected in response to this knowledge. This facilitates dynamic load balancing among modules 4. It will be appreciated that an owning module 10 experiences a higher than average usage based on the number of rows 3 in selection 8.

In some embodiments where there are a plurality of single-module tables, ownership of these tables is hashed—or assigned in a round-robin fashion—across modules 4 such that each module 4 is a module 10 for a given one or more single-module tables.

Figure 4:
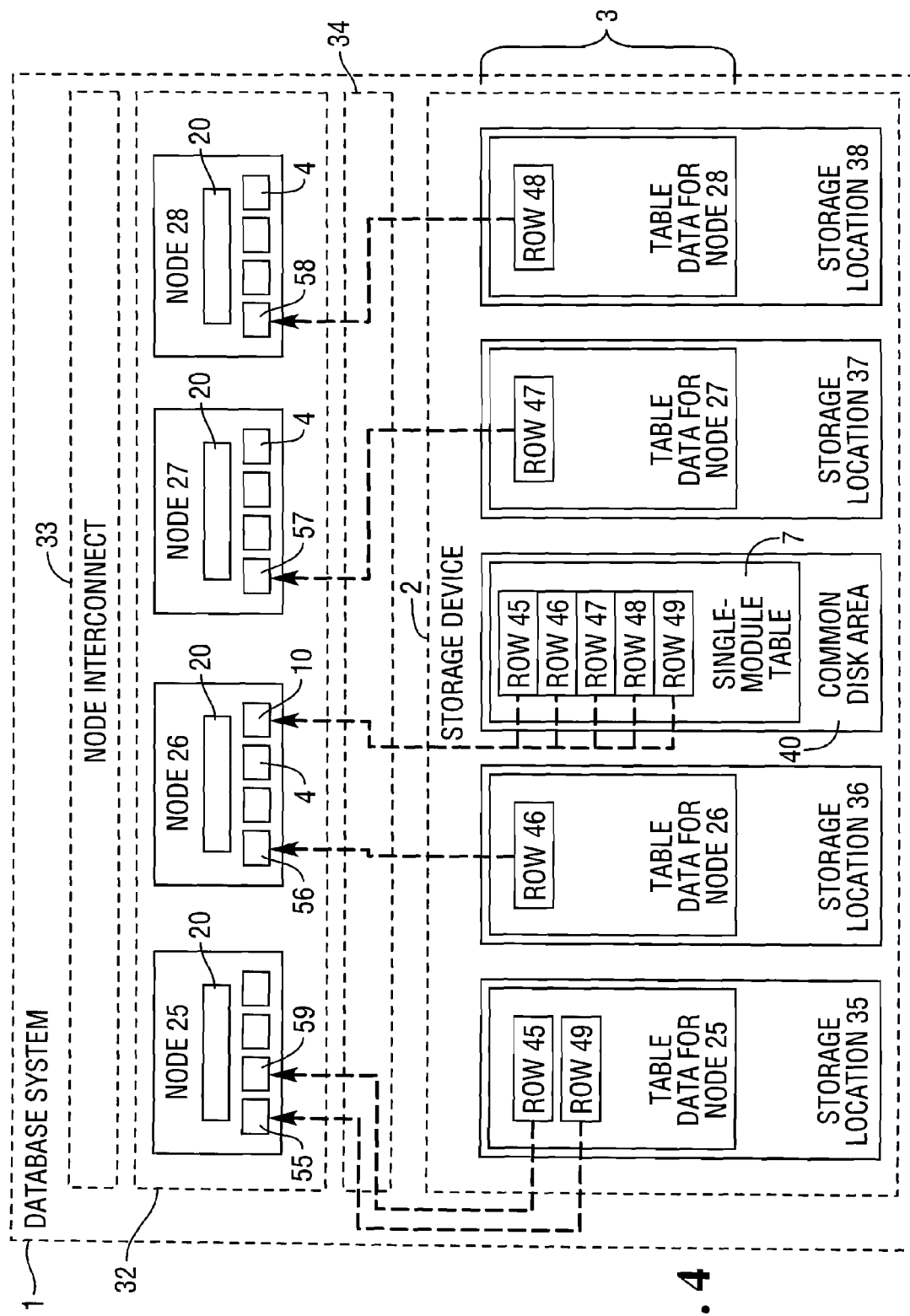
FIG. 4 is a schematic representation of a database system according to another further embodiment.

Referring to FIG. 4, each module is associated with a parser 20. Parser 20 is responsible for parsing an incoming query. Dynamic ownership facilitates appropriate selection of a module 10 that is associated with the parser 20 allocated to process a given query. For example: a parser 20 is maintained on a node, and a module 10 is selected by virtue of that module being carried by that node. This is referred to a co-location of parsing and processing, and is used to reduce communication overheads.

Dynamic ownership is in some embodiments facilitated by the provision of a common disk area (CDA), as discussed further below. In brief, a CDA is a location in device 2 accessible by any of modules 4.

FIG. 4 illustrates an embodiment of system 1 in greater detail. This embodiment makes more obvious use of MPP architecture. System 1 includes a plurality of nodes 25 to 28. Each node 25 to 28 carries four modules 4. Nodes 25 to 28 collectively define a clique 32. A node interconnect 33 is provided to enable communication between the nodes. Only a few of the illustrated modules 4 have been identified by reference numeral 4 to reduce complexity. However all of modules 4 share a common shape and size for convenient visual identification.

In the illustrated scenario, node 26 carries module 10, although as discussed the identity of module 10 is dynamic. For example: to achieve co-location of parsing and processing to a single node, or to provide load balancing as discussed above.

Device 2 is defined by a plurality of individual disks, which are not shown for the sake of simplicity in illustration. A disk interconnect 34 provides a clique-type cross connection between the nodes and the disks such that any of the nodes is able to communicate with any of the disks. This has particular benefits in managing risks associated with Mean Time Between Failures (MTBF).

Device 2 includes a plurality of individual storage locations 35 to 38, functionally defined by the table data they each hold. Specifically, a storage location 35 to 38 is provided for maintaining table data associated with each of nodes 25 to 28 respectively. For example: location 35 maintains table data indicative of rows 3 assigned to those modules 4 carried by node 25. The assignment of rows 3 to modules 4 is based on the relevant hashing protocol. As such, none of locations 35 to 38 actually maintain data indicative of a complete table.

A Common Disk Area (CDA) 40 is provided for maintaining one or more portions of the table data respectively assigned to one or more nodes 25 to 28 of system 1. This CDA 40 is accessible by any of modules 4. Table 7 is maintained on CDA 40. As a result, processor 9 is able to dynamically allocate any one of modules 4 to be the module 10 for table 7. This facilitates dynamic ownership of table 7. In the absence of a CDA 40, varying ownership of table 7 typically involves redistributing all rows of selection 8 between an existing module 10 and a proposed module 10. This is clearly a less preferable option.

In some embodiments CDA 40 is defined on or indeed defines a single physical disk, however in other embodiments it is shared across one or more individual disks. Given the clique type connection provided by interconnect 34 either is option feasibly appropriate. That being said, it is typically preferable for a location of CDA 40 to be known by modules 4 to streamline the accessing of table 7 upon changes in ownership. From a strictly definitional standpoint, CDA 40 is functionally defined by a region of device 2 that maintains one or more single-module tables. In other embodiments CDA 40 serves other purposes, which are beyond the scope of the present disclosure.

FIG. 4 illustrates both table 7 and table 17. The latter is a fallback copy of the former, and as such each include the same rows. It is assumed that data 6 in the form of a command to designate table 7 as a single module table has been provided. For this example, tables 7 and 17 have five rows, identified by reference numerals 45 to 49 respectively.

Table 17 is not specifically identified by a single reference numeral in FIG. 4 given that its rows are spread across storage locations. The identification of rows 45 to 49 across locations 35 to 38 assists in the identification of table 17.

A relatively small table—having only five rows—has been chosen for the sake of convenient illustration, and those skilled in the art will recognize how the example is equally applicable to larger tables.

The rows of table 17 are hashed as follows:
Row 45 is assigned to module 55 of node 25.
Row 46 is assigned to module 56 of node 26.
Row 47 is assigned to module 56 of node 27.
Row 48 is assigned to module 58 of node 28.
Row 49 is assigned to module 59 of node 25.

This represents a fairly straightforward hashing protocol.

It will immediately be recognized that a few of modules 4 have no rows of table 17 assigned to them.

Consider, for the sake of example, a query submitted of system 1. This query involves accessing a specific row from table 7 or 17 based on an entry in that row. For example: the tables each hold contact information, and each row includes a name and phone number. The query requests the business phone number for person X. In this simple example, the net result is that all of rows 45 to 49 are accessed to determine whether they hold the sought phone number. For the sake of example, assume this information is found in row 47.

To process this query through table 17, each of modules 55 to 59 access in parallel their respective rows to determine whether their rows include person X. The response time is very short, given that the modules need only access one row each. There is, however, a coordination overhead. This overhead particularly relates to I/Os through interconnect 33.

To process the same query through table 7, only module 10 is used. The response time is typically longer, given that a single module accesses five rows. However, the reduction in coordination overhead compensates for this.

The present example is relatively simple for the sake of convenient illustration, and it will be appreciated that effects are magnified in larger database systems. For example: a system having as many as ten cliques, ten nodes per clique, and ten modules per node—effectively meaning a thousand modules. In such an example, it is unlikely that a substantive response time reduction would be realized if a single module has to access as many as a hundred rows, however the coordination overhead of parallel processing using a hundred modules would be substantial indeed.

The above example highlights advantages of single-module tables insofar as small tables are concerned. As foreshadowed, single-module tables are also useful for single-row operations. In such situations, optimizer 18 plays a more substantial role. For example, table 7 is in the first instance large enough to cause substantial response time inadequacies where processing is handled by a single module. However, for a certain type of query—such as a single row operation—this response time inadequacy may be insignificant. Optimizer 18 will recognize from a cost-based analysis whether efficient processing of a given query prefers usage of table 7 or table 17, and a decision is made at that time.

It will be appreciated that the above disclosure provides a parallel database system that makes use of single-module tables for improved efficiency under certain conditions.

Although the present invention has been described with particular reference to certain preferred embodiments thereof, variations and modifications of the present invention can be effected within the spirit and scope of the following claims.

What is claimed is:

1. A database system including:
   a storage device for maintaining a plurality of rows;
   a plurality of access modules for accessing in parallel a respectively assigned one or more of the rows;
   an interface for receiving data indicative of a table defined by a selection of the rows; and
   a processor responsive to the data for selectively designating the table to be a single-module table wherein the selection of rows are collectively assigned to an owning one of the access modules.

2. A system according to claim 1 making use of massively parallel processing architecture.

3. A system according to claim 1 wherein the data is in the form of a user command.

4. A system according to claim 3 wherein the user command is provided by a user for designating the table to be a single module table.

5. A system according to claim 1 wherein the storage device maintains the table and of a copy of the table, and the rows defining the copy of the table are distributively assigned to a plurality of the access modules.

6. A system according to claim 5 including an optimizer responsive to a submitted database query of the table for determining whether either or both of the table and the copy of the table is to be used in the execution of the query.

7. A system according to claim 6 wherein the optimizer makes the determination on the basis of estimated processing costs of the query.

8. A system according to claim 5 wherein the single-module table is a fallback copy of the multiple-module table.

9. A system according to claim 5 wherein the multiple-module table is a fallback copy of the single-module table.

10. A system according to claim 1 wherein the owning access module is dynamic.

11. A system according to claim 10 wherein the owning access module is dynamic to provide load balancing among the plurality of modules.

12. A system according to claim 10 wherein the database system includes a plurality of nodes, each node carrying a parsing processor and one or more of the modules, and the owning access module is dynamic to allow co-location of processing and parsing to a single node for a given query.

13. A system according to claim 1 wherein the storage device includes a predefined location for maintaining the single module table.

14. A system according to claim 13 wherein the predefined location is a common disk area accessible by a predetermined one or more of the modules.

15. A system according to claim 13 wherein the common disk area is accessible by all of the plurality of modules.

16. A database system including:
    a plurality of nodes for accessing data; and
    a plurality of primary storage locations each for maintaining a portion of the data, each portion being maintained for access by a respective associated one of the nodes; and
    a secondary storage location for selectively maintaining one or more portions of the data for access by a predetermined one or more of the nodes.

17. A system according to claim 16 wherein the secondary storage location maintains the one or more portions of the data for access by any of the nodes.

* * * * *